No. 729,965. Patented June 2, 1903.

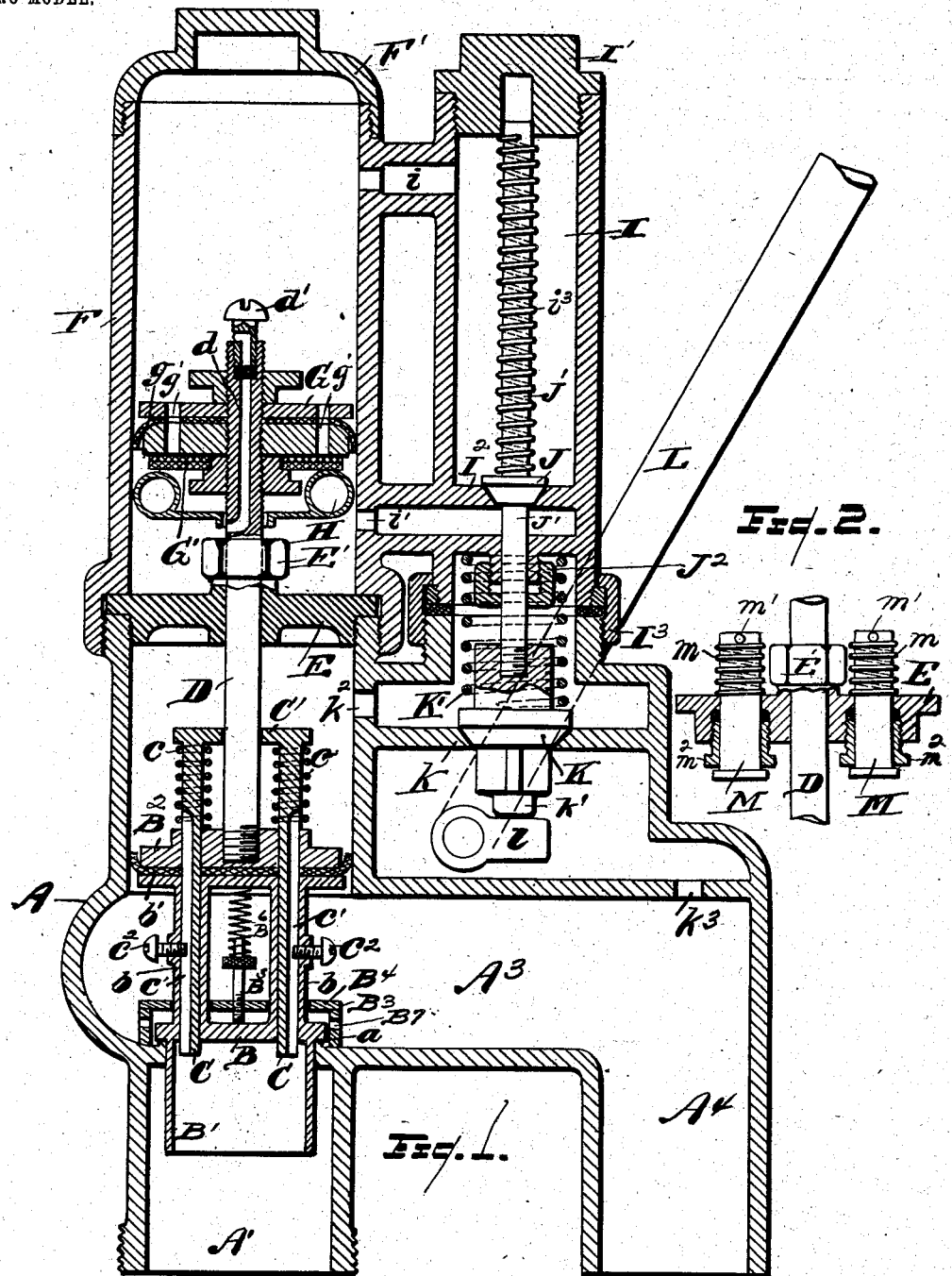

UNITED STATES PATENT OFFICE.

CHARLES SCHOSSOW AND FREDERICK A. SCHOSSOW, OF DETROIT, MICHIGAN.

AUTOMATIC FLUSHING-VALVE.

SPECIFICATION forming part of Letters Patent No. 729,965, dated June 2, 1903.

Application filed February 9, 1903. Serial No. 142,543. (No model.)

*To all whom it may concern:*

Be it known that we, CHARLES SCHOSSOW and FREDERICK A. SCHOSSOW, citizens of the United States, residing at Detroit, county of Wayne, State of Michigan, have invented a certain new and useful Improvement in Automatic Flushing-Valves; and we declare the following to be a full, clear, and exact description of the invention, such as will enable others skilled in the art to which it pertains to make and use the same, reference being had to the accompanying drawings, which form a part of this specification.

Our invention relates to an improvement in automatic flushing-valves for water-closets, shown in the accompanying drawings, and more particularly set forth in the following specification and claims.

In the drawings, Figure 1 is a vertical sectional view through our improved closet flushing-valve. Fig. 2 is a detail view showing the application of the compensating piston for use in situations where the water-pressure from the supply is of low degree.

The object of our invention is to provide an automatic valve designed to deliver the water directly from the main and to cut off the supply after a predetermined volume has passed into the closet, the construction being such as to adapt it for use in any location where sufficient water-pressure is provided regardless of whether the water supplied is clear or free of foreign matter. It is well known in employing valves of this character that the great objection to their use has been the fact that they are only adapted for employment where the water-supply was substantially pure. As stated, the object of this invention is to overcome these objections, and other advantages will appear by reference to the specification and claims.

Referring to the letters of reference shown in the drawings, A is the body of the valve, and A' the water-inlet.

B is a valve designed to cut off the passage of water from the supply, and $a$ is the valve-seat. We prefer to form the valve B with an annular collar B', projecting through the wall, forming the valve-seat.

$B^2$ is a piston designed to reciprocate in the cylinder $A^2$ and connected with the valve B by the tubes or sleeves $b\ b$. The piston $B^2$ is provided with a cup-shaped washer $b'$.

C C are rods (preferably of aluminium) sleeved within the tubes $b\ b$ and projecting through the apertures in the piston $B^2$ and valve B. These rods are connected together by a cross-piece C', provided with a central opening for the passage of the piston-rod D.

$c\ c$ are springs coiled around the rods C and bearing against the cross-piece C' and the piston $B^2$.

$c'$ represents grooves channeled in the rods C C for the passage of water from the water-supply up through the rods, discharging above the piston.

$c^2\ c^2$ are screws designed to enter the grooves $c'$ and by adjustment to regulate the size of the passage.

E is a partition having a screw-threaded engagement with the wall A and provided with a central opening for the passage of the piston-rod D.

E' is a suitable packing-nut to insure water-tight connection.

F is a closed water-chamber mounted on top of the valve-case A and secured thereto by screw-threaded connection.

G is a piston designed to reciprocate in the chamber F and mounted on the end of the piston-rod D. This piston G is also provided with a cup-washer $g$ to provide proper packing.

G' is a rubber or other disk valve mounted on the piston G, designed to close the water-passages $g'$ through the piston when the piston is moved downward, the disk valve G' being designed to open and permit the passage of the water through the piston when the same travels upward.

H is a float, which may be made of sheet metal or other suitable material, sleeved on the piston-rod D and designed to bear against the disk valve G' to insure it closing tightly when the piston travels downward.

$d$ is a passage through the upper end of the piston-rod D, its lower port being below the piston G and its point of discharge above through the regulating-screw $d'$. By adjusting this screw the aperture may be increased or diminished, as desired.

F' is a cap covering the chamber F and having a screw-threaded engagement therewith.

I is a chamber having connection with the chamber F at $i$ and $i'$ above and below the travel of the piston G. I' is a cap covering this chamber, and J is a valve having its seat in the wall $I^2$.

J' is a valve-stem provided with a controlling-spring $i^3$, bearing against the cap I' and the valve J.

$J^2$ is a suitable packing-nut to insure a water-tight joint with the valve-stem J', which projects down through the valve J and engages the valve K, having its seat in the wall $k$.

K' is a spring designed to force the valve K to its seat when the operating-lever L is released.

$l$ is a crank-arm secured to the end of the operating-lever L and bearing against the stud $k'$ on the under side of the valve K. It will be seen by throwing over the lever L the crank-arm $l$ will raise the valve K.

$k^2$ is a passage connecting the cylinder $A^2$ with the chamber above the valve K, and $k^3$ is a similar passage connecting the chamber below the valve K with the point of discharge $A^4$, leading to the closet-bowl.

$I^3$ is a suitable packing-nut to insure watertight connection between the chamber I and the valve-casing A.

We will now proceed to explain the operation of our invention. The cap F' is removed and the chamber F is filled with filtered water or other fluid free from grit or foreign matter. The cap is then screwed in position, which forms an air-chamber above the fluid. When it is desired to flush the closet, the lever is operated, raising the valve K from its seat, which discharges the water above the piston $B^2$ by allowing the same to pass out through the passage $k^2$ by way of the valve K and the passage $k^3$. The water-pressure from the main acting on the valve B forces it upward, and in doing so the piston G is forced through the column of water standing above it, the water going through the passages $g'$ in the piston. As an auxiliary to permit the more rapid movement of the piston G upward we have provided the chamber I, connected by the passages $i$ and $i'$ with the chamber F, the same being under the control of the valve J', which is simultaneously raised with the valve K by the operation of the lever L. When the lever L is released, the valves K and J are forced to their seats and the water from the main forces a passage through the channels $c'$ in the rods C and is delivered back of the piston $B^2$. When the piston G is at the limit of its upper movement and the operating-lever L is released, the piston descends through the column of water as rapidly as the water is permitted to pass up through the passages $d$ in the piston-rod D, which is under the control of the adjusting-screw. By regulating this screw the descent of the piston may be accelerated or diminished, as desired.

While it may not be necessary to employ the float H, we prefer to use the same, as it insures a close application of the valve G' and closes the passage of water through the openings $g'$ in the piston when it descends.

It will be seen that the channel-rods C, while traveling with the piston and valve, are not connected directly therewith, but are independent of the same, so that when the cross-piece C' comes in contact with the cap E the piston may move upward, allowing the rods to project a greater distance beyond the valve B. This movement insures the immediate discharge of any grit or other foreign matter which might possibly clog or begin to clog the passage of the water through the channel leading to the back of the piston. Instead of the channels the rods may be of such a diameter as to permit the passage of water around them up through the sleeves surrounding the rods. By providing the screws $c^2$ we are able to regulate the size of the passage and in this way can control the water, and thus the speed of the valve B to its seat.

It will be apparent that the auxiliary chamber I and the valve J, controlling the passages connecting the chamber F with the chamber I, may be dispensed with; but we find the same is advantageous where a quick movement of the water in the closed chamber is desired.

In order to insure the afterflow necessary in siphon-closets to provide a water seal, we surround the valve B with the annular collar $B^3$, provided with apertures $B^7$ and also provided with the cross-piece $B^4$, preferably integral therewith.

$B^5$ is a regulating-screw having a screw-threaded engagement with the cross-piece $B^4$.

$B^6$ is a spring bearing against the piston $B^2$ and the nut of the regulating-screw $B^5$.

It will be seen that as the valve descends in the act of closing that the annular collar $B^3$ will first come in contact with the wall of the valve-casing and practically cut off the supply of water to the closet. This will destroy the siphon; but before the valve proper reaches its seat sufficient water will pass through the openings $B^7$ to form the water seal.

We will now proceed to explain the parts shown in Fig. 2. When the water-pressure from the main is low, it may be desirable to employ what we term the "compensating pistons" shown in this figure. Referring to the letters of reference shown in the drawings, E is the partition or cap screwed on top of the valve-chamber. M is a compensating piston, any desired number of which may be employed. $m$ is a spring coiled around the piston-bearing on the cap E and against a pin or shoulder $m'$, secured to the piston, the action of the spring holding the piston in an elevated position within the cylinder F. $m^2$ is a suitable packing-nut. The object of these compensating pistons is to provide an increased area within the cylinder or chamber F without dispensing with any portion of the liquid or air that may be contained in said chamber, so that when the piston is forced upward the displacement which would be required on account of the piston-rod entering the chamber will be relieved by the movement of the compensating pistons downward. This also obviates any tendency there may be to force the water out if a slight leak through the packing should occur when the pressure is greater either in the upper chamber or in the valve, making it possible to completely fill the upper chamber with water, if found desirable. It will be seen that the upward movement of the piston is in exact relation to the release of pressure on the valve and that the piston-rod on entering the chamber F will cause the compensating pistons M to be forced downward. Should any foreign substances adhere to the piston-rod, it will be prevented from entering the upper chamber by the packing, and as the water in the lower chamber is changed each time the valve is operated foreign substances are carried away with the water.

It will be seen by operating the valve K that the water-pressure in the chamber above the piston $B^2$ will be relieved and the water-pressure from the supply will force the valve B from its seat. This action will cause the rods C to be forced downward when the cross-piece C' comes in contact with the cap E. This movement of the rods frees the passage through the sleeves $b$ of any foreign matter which may have lodged there on the previous delivery of water above the piston $B^2$. It will be seen that the act of raising the valve K will force the rods C downward to provide for the displacement of water caused by raising the valve, and, as before explained, the pressure from the main on the valve will cause the water in the cylinder above the piston to pass out the ports $k^2$ and $k^3$, the pressure from the supply driving the rods C upward until the cross-piece C' comes in contact with the cap E. This movement given to the rods C by the action of the water from the supply and the downward movement produced by the raising of the valve and also the pressure from the supply entering back of the piston when the valve is seated insures the dislodgment of any foreign matter which might otherwise collect in the channels leading back of the piston. It will also be seen that the movement of the valve B to its seat may be entirely controlled by adjusting the screws $c^2$.

The auxiliary chamber I and the valve J, controlling the passage of water through the same, is employed only in case where the water-pressure from the supply is too low to force the piston G up through the column of water in the chamber F in a given time. By the use of this auxiliary chamber a portion of the contents in the chamber F may pass through the same, the remainder going through the piston. This auxiliary valve need not be employed where the water-pressure from the supply is sufficient to force the piston G upward within the time required.

Having thus described our invention, what we claim is—

1. In an automatic flushing-valve, a valve for controlling the source of supply, an annular collar encircling said valve provided with openings for the passage of water having a movement independent of the valve, means for adjusting said collar with relation to the face of the valve whereby the collar may first come in contact with the valve-seat to momentarily check or shut off the source of supply before the application of the valve proper, substantially as described.

2. In an automatic flushing-valve, a valve controlling the source of supply, a piston connected therewith, channels for the passage of water through the valve and piston, a closed water-chamber located directly above the valve, a piston G, a piston-rod connecting the same with the piston-valve, ports through said piston G for the passage of water, a valve for controlling the same, a channel through said piston-rod having an opening below the piston G and discharging above said piston, and a regulating-screw to control the passage of water through said channel, substantially as described.

3. In an automatic flushing-valve, a closed water-chamber, a piston traveling in said chamber, ports for the passage of water through said piston, a disk valve for controlling the same, and a float located below said disk valve, designed to insure close application of the disk valve, substantially as described.

4. In an automatic flushing-valve, a closed water-chamber, a piston traveling in said chamber connected with the valve controlling the source of supply, a passage through said piston for water, a valve controlling the same, an independent passage having an opening above and below the piston, means for controlling the same, an auxiliary chamber provided with a passage by said piston having an opening above and below the piston, and a valve for controlling said passage, substantially as described.

5. In an automatic flushing-valve, a valve to control the source of supply, a piston connected directly with said valve, a passage to deliver the water through said valve above the piston, a closed water-chamber located above the valve-chamber, a piston G traveling in said chamber connected directly with the piston-valve, ports $g'$ for the passage of water through the piston, a valve G' to control said ports, an independent passage to deliver the water through said piston provided with means for regulating the same, and a valve K under the control of the operator to permit the passage of water from above the piston-valve, substantially as described.

6. In an automatic flushing-valve, a piston-valve, a closed water-chamber located above the valve-chamber, a piston-rod connecting the same with the piston-valve, pistons mounted in the wall of the closed water-chamber designed to act in conjunction with the upward movement of the piston-rod entering the closed water-chamber thereby providing for the displacement due to the entry of the same, substantially as described.

7. In an automatic flushing-valve, the combination of the valve controlling the passage of water from the main, a piston of relatively larger diameter than that of the valve connected therewith, a passage for water through the valve delivering back of the piston, a movable member sleeved within said passage and having a movement independent of the piston and valve, a closed water-chamber located directly above the valve, a piston G, a piston-rod connecting the same with the piston-valve, ports through said piston G for the passage of water, a valve for controlling the same, an independent passage having an opening above and below the piston, and means for controlling the same, substantially as described.

In testimony whereof we sign this specification in the presence of two witnesses.

CHARLES SCHOSSOW.
FREDERICK A. SCHOSSOW.

Witnesses:
S. E. THOMAS,
H. E. VILLEROT.